United States Patent
Moskalchuk et al.

(10) Patent No.: US 12,462,035 B1
(45) Date of Patent: Nov. 4, 2025

(54) DYNAMIC KERNEL SECURITY MODULE

(71) Applicant: CyberArk Software Ltd., Petach-Tikva (IL)

(72) Inventors: Dmitry Moskalchuk, Petach-Tikva (IL); Ilya Abramovich, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 18/883,251

(22) Filed: Sep. 12, 2024

(51) Int. Cl.
*G06F 21/54* (2013.01)
*G06F 21/57* (2013.01)

(52) U.S. Cl.
CPC ............ *G06F 21/572* (2013.01); *G06F 21/54* (2013.01)

(58) Field of Classification Search
CPC .............................. G06F 21/572; G06F 21/54
See application file for complete search history.

(56) References Cited

U.S. PATENT DOCUMENTS

| | | | | |
|---|---|---|---|---|
| 10,310,863 | B1 * | 6/2019 | Poimboeuf | G06F 8/656 |
| 2002/0152330 | A1 * | 10/2002 | Casper | G06F 11/3632 |
| | | | | 714/E11.214 |
| 2003/0009685 | A1 * | 1/2003 | Choo | G06F 21/6218 |
| | | | | 713/165 |
| 2003/0018892 | A1 * | 1/2003 | Tello | G06F 21/85 |
| | | | | 713/164 |
| 2004/0158720 | A1 * | 8/2004 | O'Brien | G06F 21/53 |
| | | | | 713/176 |
| 2017/0344361 | A1 * | 11/2017 | Zhang | G06F 8/654 |
| 2020/0257810 | A1 * | 8/2020 | Vrabec | G06F 21/53 |
| 2021/0240467 | A1 * | 8/2021 | Hu | G06F 8/656 |

FOREIGN PATENT DOCUMENTS

EP 4145318 A1 * 3/2023 ............ G06F 21/54

OTHER PUBLICATIONS

Ramaswamy, A., Detecting kernel rootkits, 2008. (Year: 2008).*

* cited by examiner

*Primary Examiner* — Trong H Nguyen
(74) *Attorney, Agent, or Firm* — Finnegan, Henderson, Farabow, Garrett Dunner, LLP

(57) ABSTRACT

Disclosed embodiments relate to systems and methods for securing kernel-level system functions. Techniques include hot patching of a kernel by a kernel module loaded into the kernel; identifying a kernel function initiated by a system call associated with a user-level application; intercepting the kernel function by the kernel module; making available, to a security agent, an indication of at least one operation associated with the kernel function; receiving, from the security agent, a determination of whether the at least one operation associated with the kernel function violates at least one security policy; and based on the determination indicating the at least one operation does not violate the at least one security policy, allowing the system call to the kernel; or based on the determination indicating the at least one operation violates at least one security policy, performing at least one control action.

23 Claims, 8 Drawing Sheets

DYNAMIC KERNEL SECURITY MODULE

BACKGROUND

Technical Field

The present disclosure relates generally to cybersecurity and, more specifically, to techniques for securing kernel-level system functions through hot patching a kernel.

Background Information

In modern network-based environments, it is increasingly important for organizations and individuals alike to securely control which users and processes are authorized to perform sensitive operations. Many computer systems enforce privileges to perform security-relevant functions through the use of one or more security policies. However, as various techniques are developed for enforcing these security policies, attackers continuously find ways to circumvent these measures.

One solution to thwart would-be attackers is to implement security policies at the kernel level. For example, the Linux™ operating system supports the use of Linux Security Modules (LSM), which enable implementing a mandatory access control (MAC) module to protect such systems from attacks. These techniques allow individual applications to be isolated, which may limit access to attackers who have compromised part of a system. Example LSMs include AppArmor™ and SELinux™, which are included in many Linux™ kernel distributions.

Despite the term "module," however, these LSMs are a static part of the Linux™ kernel. These LSMs can be either enabled or disabled for a specific Linux kernel at build time and this choice cannot be changed thereafter. The LSMs become part of the module chain and are called by the LSM subsystem every time the security check is needed inside the Linux™ kernel. These techniques thus provide very minimal flexibility and cannot be altered in any way during runtime.

Accordingly, in view of these and other deficiencies in existing techniques, technological solutions are needed for improving security at the kernel level while maintaining flexibility for users. In particular, solutions should advantageously provide the ability to enable or disable the security module at runtime, without requiring the kernel to be rebuilt.

SUMMARY

The disclosed embodiments describe non-transitory computer readable media, systems, and methods for dynamically securing kernel-level system functions. For example, in an embodiment, a non-transitory computer readable medium may include instructions that, when executed by at least one processor, cause the at least one processor to perform operations for dynamically securing kernel-level system functions. The operations may comprise hot patching of a kernel by a kernel module loaded into the kernel; identifying a kernel function initiated by a system call associated with a user-level application; intercepting the kernel function by the kernel module; making available, to a security agent, an indication of at least one operation associated with the kernel function; receiving, from the security agent, a determination of whether the at least one operation associated with the kernel function violates at least one security policy; and based on the determination indicating the at least one operation does not violate the at least one security policy, allowing the system call to the kernel; or based on the determination indicating the at least one operation violates at least one security policy, performing at least one control action.

According to a disclosed embodiment, prior to the hot patching, the kernel may be unaltered relative to a build time of the kernel.

According to a disclosed embodiment, the kernel may be associated with a kernel distribution.

According to a disclosed embodiment, the hot patching of the kernel may be performed based on a request from an additional application.

According to a disclosed embodiment, the hot patching of the kernel may include replacing an instruction of a kernel function with a replacement instruction.

According to a disclosed embodiment, the instruction may be a no-op instruction and the replacement instruction may be a JMP instruction directed to an ftrace function.

According to a disclosed embodiment, the ftrace function may be configured to replace a value of an instruction pointer register with an address of a replacement function.

According to a disclosed embodiment, the hot patching of the kernel may include corrupting an original instruction of a kernel function to generate a corrupted instruction.

According to a disclosed embodiment, the corrupted instruction may trigger a kprobes mechanism.

According to a disclosed embodiment, the kprobes mechanism may be configured to replace a value of an instruction pointer register with an address of a replacement function.

According to a disclosed embodiment, allowing the system call to the kernel may include invoking a detour buffer configured to perform the original instruction of the kernel function.

According to a disclosed embodiment, the original instruction of the kernel function performed by the detour buffer may be adjusted.

According to a disclosed embodiment, performing the hot patching of the kernel may include corrupting a CPU opcode associated with the kernel function to generate a corrupted CPU opcode.

According to a disclosed embodiment, the corrupted CPU opcode may be configured to trigger a hardware interruption to invoke the kernel module.

According to a disclosed embodiment, the at least one CPU opcode may be corrupted based on a determination that at least one of an ftrace mechanism or a kprobes mechanism has been disabled.

According to another disclosed embodiment, there may be a computer-implemented method for dynamically securing kernel-level system functions. The method may comprise hot patching of a kernel by a kernel module loaded into the kernel; identifying a kernel function initiated by a system call associated with a user-level application; intercepting the kernel function by the kernel module; making available, to a security agent, an indication of at least one operation associated with the kernel function; receiving, from the security agent, a determination of whether the at least one operation associated with the kernel function violates at least one security policy; and based on the determination indicating the at least one operation does not violate the at least one security policy, allowing the system call to the kernel; or based on the determination indicating the at least one operation violates at least one security policy, performing at least one control action.

According to a disclosed embodiment, the at least one control action may include preventing the at least one operation.

According to a disclosed embodiment, making available the indication of the at least one operation may include querying the security agent.

According to a disclosed embodiment, the security agent may be an application executing in a user space.

According to a disclosed embodiment, the method may further comprise authenticating the security agent.

According to a disclosed embodiment, the security agent may include verifying a signature of the security agent using a cryptographic key.

According to a disclosed embodiment, the at least one operation may include at least one of: execution an executable file, writing to at least one file, or removing at least one file.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for dynamically securing kernel-level system functions described herein overcome several technological problems relating to security, efficiency, and flexibility in the fields of cybersecurity and network security. In particular, the disclosed embodiments provide a dynamic security module that may be enabled or disabled at any time. As discussed above, LSMs provide kernel-level enforcement of security policies but provide no flexibility for dynamically enabling or disabling the security modules. To address this, the disclosed systems may provide similar security features through a loadable kernel module (LKM). Despite the terms "loadable kernel module" and "Linux™ Security Module" both including the word "module," these concepts are implemented in very different ways. An LKM is an object file that contains code to extend the running kernel, or so-called base kernel, of an operating system, and is typically used to add support for new hardware (as device drivers) and/or filesystems, or for adding system calls. When the functionality provided by an LKM is no longer required, it can be unloaded to free memory and other resources.

The disclosed embodiments, may enforce a security policy through an LKM. When the LSM is loaded into the running kernel, it may automatically locate various places in the running kernel memory and hot patch them accordingly. The hot patching may be implemented safely and seamlessly, such that for every specific execution thread, the execution flow either follows the original execution flow or is diverted into the LKM code. When the LKM is unloaded, it reverts all the changes done at the loading stage and returns the running Linux™ kernel into its initial state. Accordingly, the disclosed techniques enable a security policy to be enforced at the kernel level without disrupting existing kernel functionality. Moreover, the security policy enforcement can be enabled or disabled dynamically, even when the kernel is running.

Reference will now be made in detail to the disclosed embodiments, examples of which are illustrated in the accompanying drawings.

Figure 1:
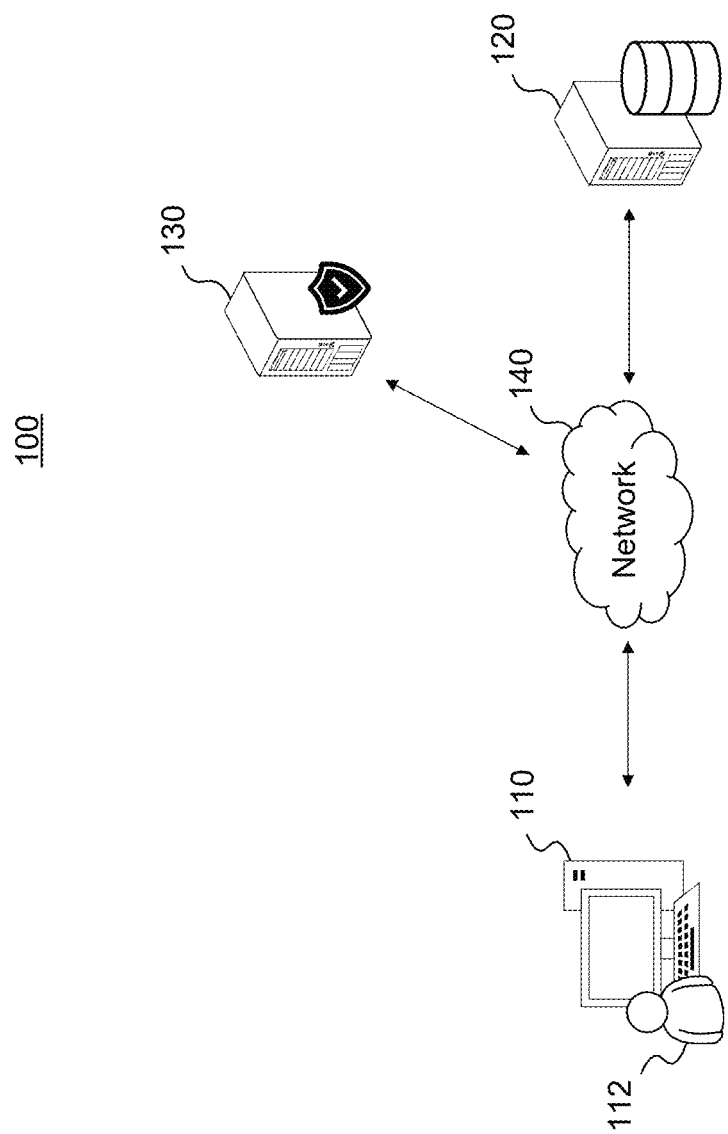
FIG. 1 illustrates an example system environment for dynamically securing kernel-level system functions, consistent with the disclosed embodiments.

FIG. 1 illustrates an example system environment 100 for dynamically securing kernel-level system functions, consistent with the disclosed embodiments. System environment 100 may include one or more computing devices 110, one or more target resources 120, and one or more security servers 130, as shown in FIG. 1. System environment 100 may represent a system or network environment in which various computing operations may be performed. For example, computing device 110 (or an entity associated with computing device 110, such as identity 112) may request to perform a computing operation within system environment 100. In some embodiments, this may include a network-based computing operation. For example, this may include an operation involving a file or other data on target resource 120. Alternatively or additionally, this may include a local computing operation. For example, the local computing operation may be an operation involving a file stored in computing device 110. Accordingly, while system environment 100 is shown in FIG. 1 to include target resource 120 and security server 130 separately from computing device 110 by way of example, in some embodiments, one or both of target resource 120 and security server 130 may be integrated with computing device 110. For example, target resource 120 may be a local resource of computing device 110 and security server 130 may be an agent or other process running on computing device 110. Accordingly, system 100 may not necessarily be a network-based system environment and may be a local environment of computing device 110.

The various components of system environment 100 may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

As noted above, system environment 100 may include one or more computing devices 110. Computing device 110 may include any device that may be used for performing various computing operations as described herein. Accordingly, computing device 110 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of performing a computing operation. In some embodiments, computing device 110 may be a virtual machine (e.g., based on AWS™, Azure™, IBM Cloud™ etc.), container instance (e.g., Docker™ container, Java™ container, Windows Server™ container, etc.), or other virtualized instance.

In some embodiments, computing device 110 may be associated with an identity 112. Identity 112 may be any entity that may be associated with one or more privileges required to perform a computing operation. For example, identity 112 may be a user, an account, an application, a process, a service, an electronic signature, or any other entity or attribute associated with one or more components of system environment 100. In some embodiments, identity 112 may be a user requesting to perform a computing operation through computing device 110. As noted above, this may be a computing operation associated with data on computing device 110, target resource 120, and/or security server 130.

Target resource 120 may include any form of remote computing device that may be the target of a computing operation or computing operation request. Examples of network resource 120 may include SQL servers, databases or data structures holding confidential information, restricted-use applications, operating system directory services, access-restricted cloud-computing resources (e.g., an AWS™ or Azure™ server), sensitive IoT equipment (e.g., physical access control devices, video surveillance equipment, etc.), and/or any other computer-based equipment or software that may be accessible over a network. Target resource 120 may include various other forms of computing devices, such as a mobile device (e.g., a mobile phone or tablet), a wearable device (a smart watch, smart jewelry, implantable device, fitness tracker, smart clothing, or head-mounted display, etc.), an IoT device (e.g., a network-connected appliance, vehicle, lighting, thermostat, room access controller, building entry controller, parking garage controller, sensor device, etc.), a gateway, switch, router, portable device, virtual machine, or any other device that may be subject to computing operations. In some embodiments, target resource 120 may be a privileged resource, such that access to the target resource 120 may be limited or restricted. For example, access to the target resource 120 may call for a privileged credential (e.g., a password, a username, an SSH key, an asymmetric key, a security or access token, etc.). In some embodiments target resource 120 may not necessarily be a separate device from computing device 110 and may be a local resource. Accordingly, target resource 120 may be a local hard drive, database, data structure, or other resource integrated with computing device 110.

Security server 130 may be configured to monitor and/or manage one or more security policies within system environment 100. For example, security server 130 may manage one or more privileges associated with identity 112 (or computing device 110) required to perform computing operations within system environment 100. In some embodiments, security server 130 may represent a privileged access management (PAM) system or other access management system implemented within system environment 100. Alternatively or additionally, security server 130 may be a security information and event management (SIEM) resource implemented within system environment 100. Security server 130 may be configured to grant, track, monitor, store, revoke, validate, or otherwise manage privileges of various identities within system environment 100. While illustrated as a separate component of system environment 100, it is to be understood that security server 130 may be integrated with one or more other components of system environment 100. For example, in some embodiments, security server 130 may be implemented as part of target network resource 120, computing device 110, or another device of system environment 100. In some embodiments, a separate security server may not be used and a security policy may be enforced through a security agent running on a computing device, such as security agent 340 as described below. Alternatively or additionally, the security agent may communicate with security server 130 to enforce security policies.

Figure 2:
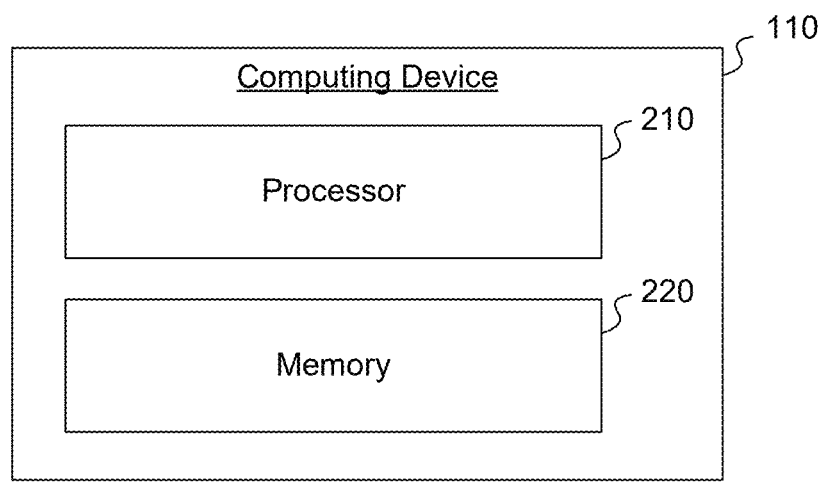
FIG. 2 is a block diagram showing an example computing device, consistent with the disclosed embodiments.

FIG. 2 is a block diagram showing an example computing device 110, consistent with the disclosed embodiments. As described above, computing device 110 may be a device configured to perform (or request to perform) one or more computing operations and may include one or more dedicated processors and/or memories. For example, computing device 110 may include a processor (or multiple processors) 210, and a memory (or multiple memories) 220, as shown in FIG. 2.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. Processor 210 may also be a processor based on the ARM architecture, a processor based on the RISC-V architecture, a mobile processor, a graphics processing unit, or any other form of processor. The disclosed embodiments are not limited to any particular type of processor configured in computing device 110.

Memory 220 may include one or more storage devices configured to store instructions used by the processor 210 to perform functions related to computing device 110 described herein. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may, in some embodiments, execute one or more programs (or portions thereof) remotely located from computing device 110. Furthermore, memory 220 may include one or more storage devices configured to store data for use by the programs. Memory 220 may include, but is not limited to a hard drive, a solid state drive, a CD-ROM drive, a transient or temporary storage device (e.g., a random-access memory ("RAM")), a peripheral storage device (e.g., an external hard drive, a USB drive, etc.), a network drive, a cloud storage device, or any other storage device.

Computing device 110 may include various security components configured to evaluate kernel-level system functions performed on computing device 110. For example, when a user-level application performs a system call involving a kernel function, the function may be intercepted by a kernel module and evaluated against a security policy. As described herein, the kernel module may be implemented through a hot patching technique such that the security policy may be enforced dynamically. For example, the kernel module may be enabled or disabled as needed during runtime of the kernel instead of at build time. Moreover, the security policy itself can be updated dynamically to address evolving security needs.

Figure 3:
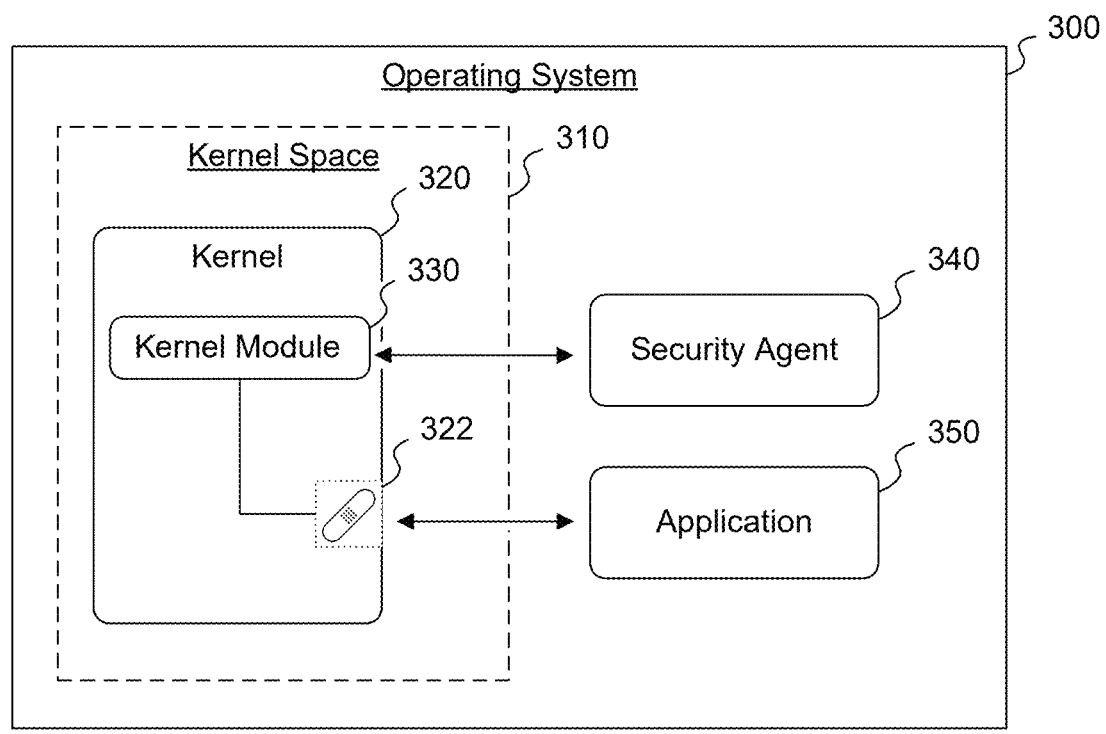
FIG. 3 is a block diagram showing an example operating system of a computing device, consistent with the disclosed embodiments.

FIG. 3 is a block diagram showing an example operating system 300, consistent with the disclosed embodiments. Operating system 300 may represent an operating system of a computing device through which a computing operation is performed (or requested to be performed). For example, operating system 300 may be an operating system of computing device 110 and thus may be executing using processor 210 and/or memory 220, as described above. Operating system 300 may be a Linux™ operating system or distributions thereof, such as Debian-, Pacman-, RPM-, Gentoo-, Slackware-, or Android-based distributions, or similar distributions. One of ordinary skill in the art would further recognize that various aspects of the disclosed embodiments may equally apply in other types of operating platforms, such as Microsoft Windows™, Apple macOS™, Apple IOS™, Google Android™, or the like. Operating system 300 may include a kernel space 310, as shown in FIG. 3. Kernel space 310 may represent a protected space of operating system 300, which may be reserved for running a kernel 320. For example, operating system 300 may be a Linux™ operating system and kernel 320 may be a Linux™ kernel executing within kernel space 310. Operating system 300 may further include a user space dedicated for running user applications outside of the system's kernel.

Operating system 300 may include an application 350, which may be a user-level application. For example, application 350 may operate in a user space (which may be distinct from the kernel space), as shown in FIG. 3. Application 350 may be any process or application executing on operating system 300 that may request to perform a computing operation associated with a kernel function. This may include a request to access a file, modify a file, delete a file (or a portion of a file), obtain a new credential, add a new user or user group, mount an image file, execute a kernel space code, perform network-related tasks, or any other action that may require privileges. For example, identity 112 may operate computing device 110 to perform a computing operation through application 350 and, as a result, application 350 may request to perform the computing operation. Accordingly, application 350 may be a product of an executable file that was executed by a privileged user or process, such as identity 112. Alternatively or additionally, application 350 itself may be the product of running a file with privileges. The target of the computing operation may be local to computing device 110 or may be remote (e.g., at target resource 120, etc.), as described above.

Consistent with the disclosed embodiments, a kernel module 330 may be loaded into kernel 320. Kernel module 330 may be configured to enable the various techniques for dynamically securing kernel-level system functions described herein. Notably, kernel module 330 may be a type of module that may be implemented dynamically during a runtime of kernel 320. For example, if kernel 320 is a Linux™ kernel, kernel module 330 may be implemented as a loadable kernel module (LKM) to extend the running kernel of operating system 300. Accordingly, kernel module 330 may be loaded dynamically, similar to LKMs used for adding new device drivers, filesystems, or system calls. Kernel module 330 may thus be distinct from a Linux™ Security Module (LSM) which must be implemented during build time of kernel 320. Accordingly, kernel module 330 may provide improved flexibility over a LSM, allowing a user to enable or disable kernel module 330 as needed.

Once loaded into kernel 320, kernel module 330 may be configured to perform a hot patching technique to enable the various security functions disclosed herein. For example, this may include implementing hot patch 322, as shown in FIG. 3. As used herein "hot patching" (also referred to as "hotpatching") may refer to any form of patching or modification to a kernel function. In some embodiments, hot patching may include exploiting various features of the kernel to redirect the execution flow of one or more kernel functions from the normal kernel to kernel module 330. For example, hot patch 322 may enable kernel module 330 to intercept various kernel functions invoked by system calls of application 350. Kernel module 330 may then analyze these kernel functions to determine whether they violate one or more security policies and may take necessary steps to enforce the security policies. This hot patching technique may thus enable kernel module 330 to provide kernel-level security functions, similar to a Linux™ Security Module, while maintaining the flexibility of a loadable kernel module. Various example hot patching techniques are described in greater detail below.

While a Linux™ operating system is used by way of example, one of ordinary skill in the art would recognize that similar forms of modules may be implemented in various other systems. For example, kernel module 330 may be implemented as a kernel loadable module (kld) in a FreeBSD™ operating system, a kernel extension (kext) in a macOS™ operating system, a kernel extension module in an AIX™ operating system, a dynamically loadable kernel module in an HP-UX™ operating system, a kernel-mode driver in a Windows NT operating system, a downloadable kernel module (DKM) in a VxWorks™ operating system, or the like.

Moreover, even within a specific OS family, kernel module 330 may be applied to many different distributions of the kernel. For example, within the Linux™ family, kernel module 330 may be used in many different distributions, such as Debian™, Fedora™, Arch™, Ubuntu™, or other distributions. Prior to hot patching by kernel module 330, kernel 320 may be unaltered relative to a build time of kernel 320. In other words, the hot patching may not require any form of treatment to the kernel prior to the hot patching. The security advantages described herein may thus be achieved using a wide variety of kernel types without any required special customizations. It is to be understood that a kernel unaltered relative to a build time of the kernel may already include the various customizations based on different distributions described above. However, it is the hot patching techniques described herein that alter the kernel's behavior to provide the disclosed security improvements.

According to some embodiments, kernel module 330 may interface with a security agent, such as security agent 340, to analyze one or more kernel functions. In some embodiments, this may include providing an indication of an operation associated with a kernel function to security agent 340, which may then determine whether the operation violates a security policy. Accordingly, security agent 340 may store or have access to one or more security policies associated with system environment 100. In some embodiments, security agent 340 may be an application executing on computing device 110. For example, as shown in FIG. 3, security agent 340 may be an application executing in a user space of operating system 300. As one example, security agent 340 may be a privilege management application, such as the CyberArk™ Endpoint Privilege Manager (EPM), which may enforce various security policies within an operating system. In some embodiments, security agent 340 (or another application) may provide a request or other form of instruction to kernel module 330 to perform hot patch 322.

In some embodiments, security agent 340 may communicate with one or more external sources for enforcing a security policy. For example, security agent 340 may be configured to provide an indication of an operation associated with a kernel function to security server 130, which may analyze the operation and provide an indication of whether the operation violates a security policy. Alternatively or additionally, security server 130 may store one or more security policies and security agent 340 may access the security policies to evaluate the operation. The various functions of security agent 340 may be shared with security server 130 in various ways, which may depend on the particular application.

Figure 4:
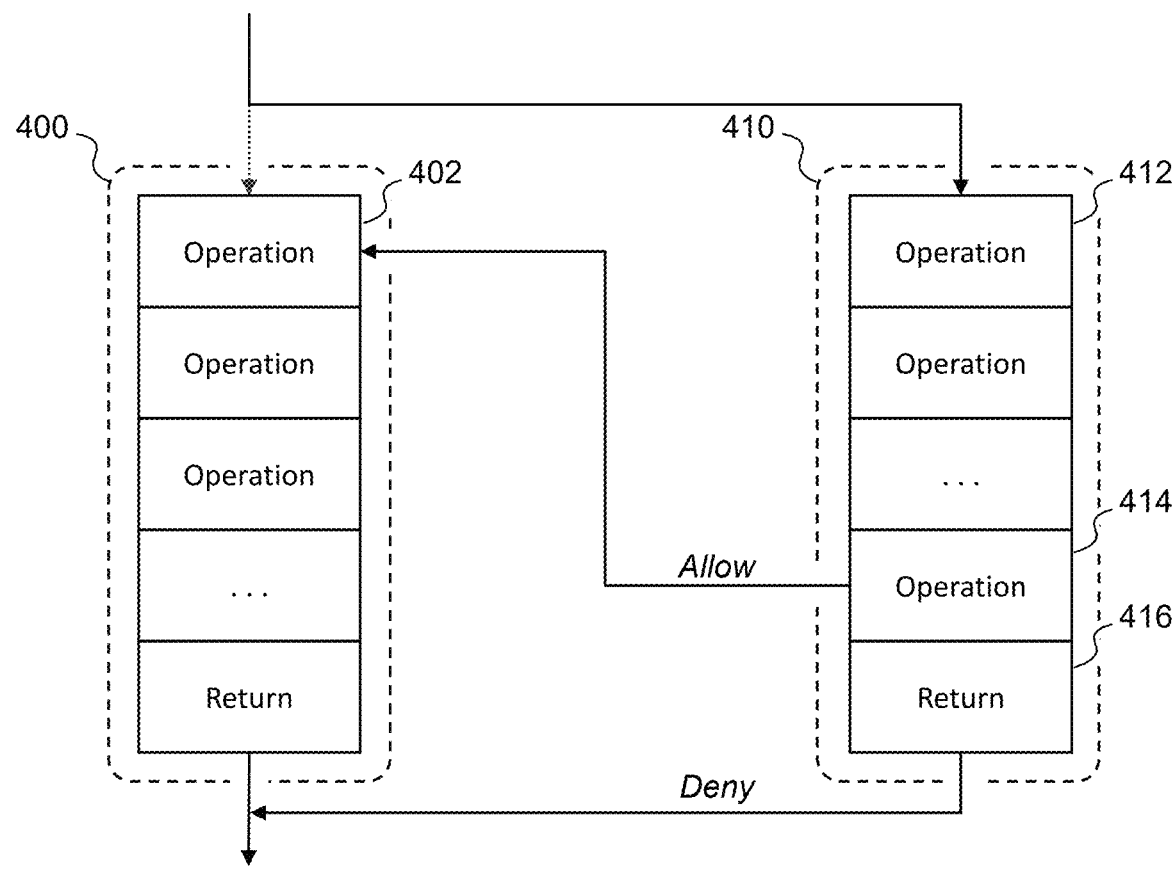
FIG. 4 is a block diagram showing an example execution path for a kernel implementing kernel module, consistent with the disclosed embodiments.

As indicated above, hot patch 322 may redirect the normal execution flow of one or more kernel functions of kernel 320 through kernel module 330. FIG. 4 is a block diagram showing an example execution path for a kernel implementing kernel module 330, consistent with the disclosed embodiments. Kernel 320 may define a kernel function 400, which may include a series of operations. Normally, when kernel function 400 is initiated (e.g., by as system call of application 350) an operation 402 may be invoked, as shown in FIG. 4. However, based on hot patch 322, an alternate function 410 defined by kernel module 330 may be called instead. For example, the system call may cause initiation of operation 412, as shown in FIG. 4. Operations 410 may enable kernel module 330 to evaluate operation 402 (or various other operations associated with kernel 320) against a security policy, as indicated above. The operation can be any operation that may be important from a security point of view. For example, operation 402 may include execution of a specific executable file, opening a specific file for writing, removal of a file, or various other operations. Operation 414 may determine that operation 402 does not violate a security policy and thus may cause the flow to return to operation 402. Alternatively, based on a determination that operation 402 does violate the security policy, operation 416 may direct the flow to skip operation 402 (and/or various other operations), effectively denying the kernel function invoked by the system call.

As indicated in FIG. 4, the hot patching techniques performed by kernel module 330 may be implemented in an atomic and safe way. For any given execution thread, the execution flow will either follow the original flow, or will be diverted to kernel module 330 code. Notably, kernel module 330 may not necessarily replace any original kernel functions. For example, if allowed, the execution flow is still directed to original kernel function 400, effectively calling them in a build-time-defined order. Accordingly, kernel module 330 may be implemented with no (or at least minimal) side effects relative to the original kernel function.

Figure 5A:
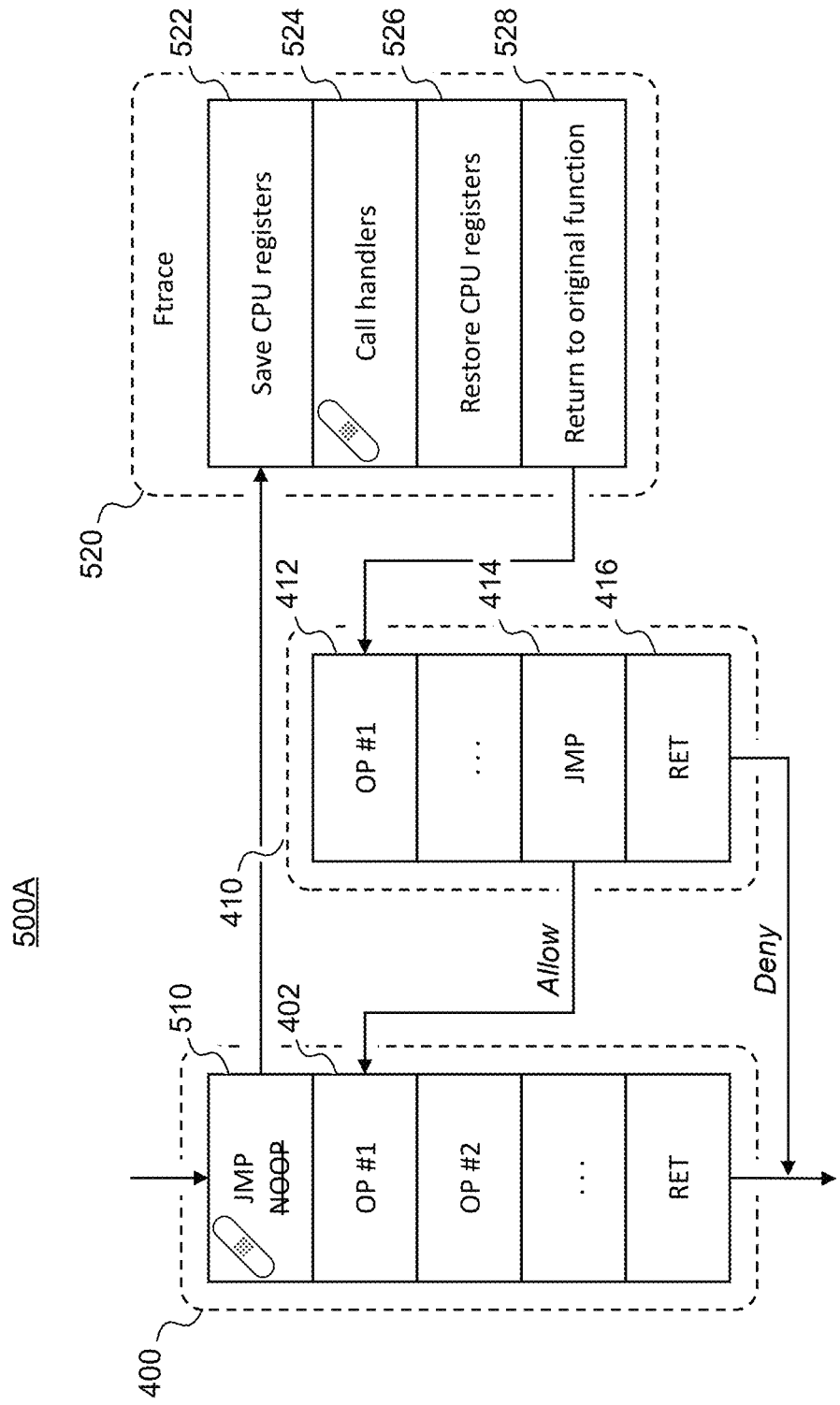
FIG. 5A illustrates an example execution flow employing an ftrace technique for hot patching a kernel, consistent with the disclosed embodiments.
Figure 5B:
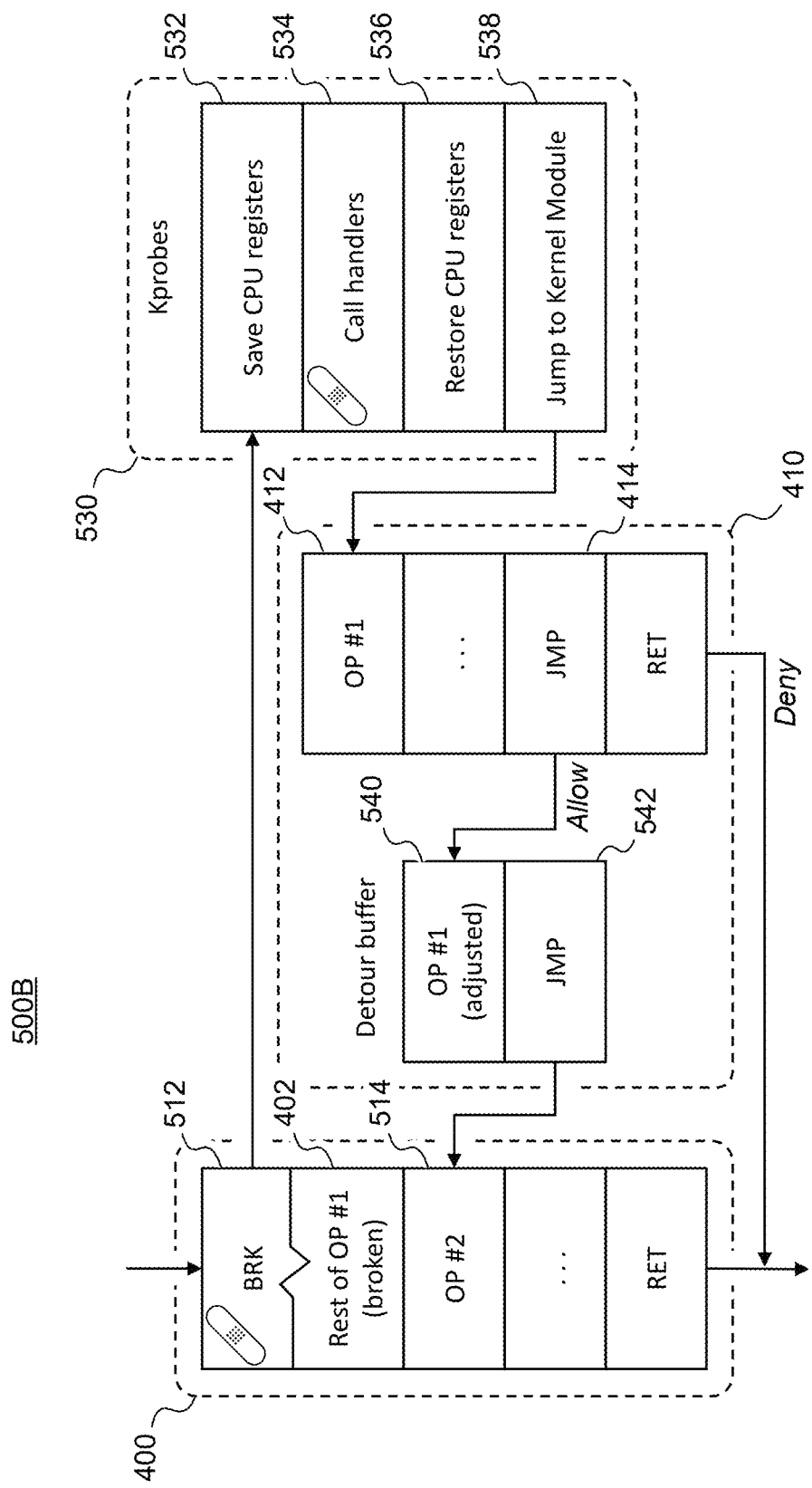
FIG. 5B illustrates an example execution flow employing a kprobes technique for hot patching a kernel, consistent with the disclosed embodiments.
Figure 5C:
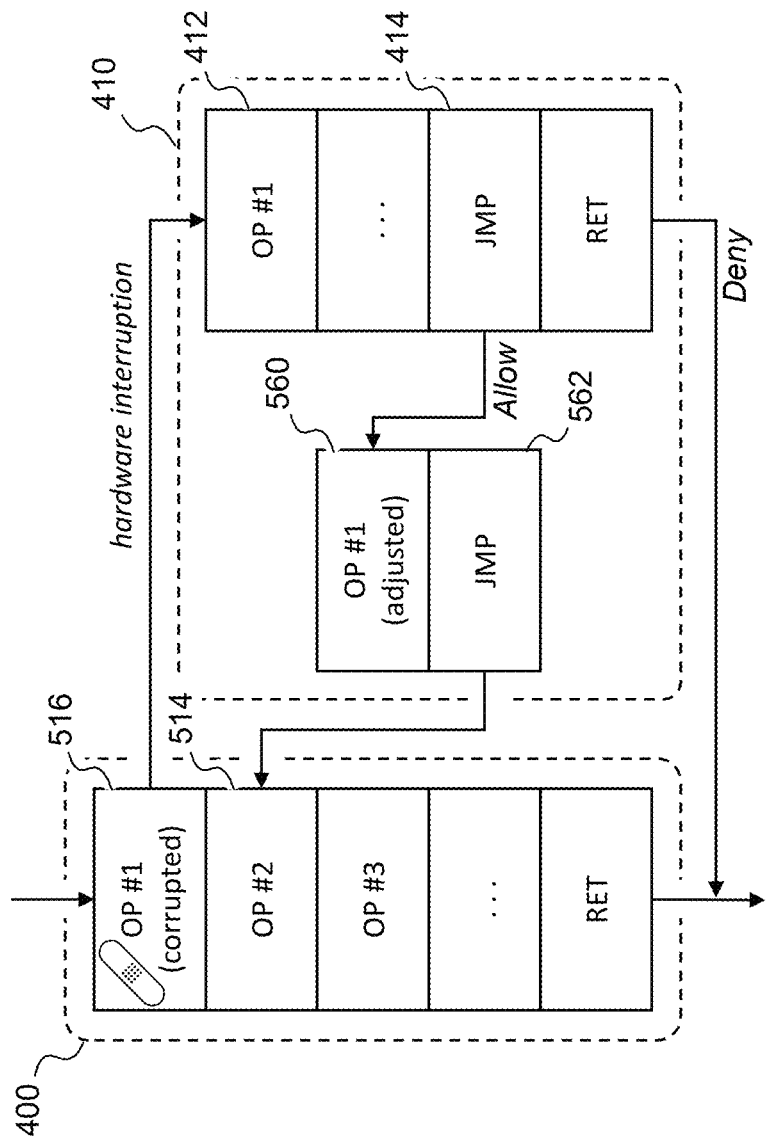
FIG. 5C illustrates an example execution flow employing a hardware interruption technique for hot patching a kernel, consistent with the disclosed embodiments.

The specific techniques utilized for hot patch 322 may vary depending on the system and the particular build of kernel 320. Accordingly, there may be no guarantee that specific functions are located at specific addresses. For example, function addresses may be highly volatile and may be managed by the compiler and the linker at build time, and by the boot loader (GRUB, UEFI, etc.) at the boot time. Kernel module 330 may thus be configured to locate a particular address of kernel function 400 and various other functions to be patched within kernel 320. In some embodiments, this search may be performed dynamically to accommodate a variety of different builds of kernel 320. In the example of a Linux™ kernel, this dynamic searching may include using a "kallsyms_lookup_name" technique to find an address of kernel function 400. In some embodiments, (e.g., for Linux™ kernel versions 5.7.0 or later), this may further include the use of a kernel probe (also referred to as "kprobes") mechanism to find the address of "kallsyms_lookup_name." In some cases (e.g., where "kallsyms_lookup_name" fails), the kprobes technique may be used directly to find the addresses of specific functions. Alternatively or additionally (e.g., if kprobes fails), a printk-based heuristic technique may be used to find an address of kernel function 400. Once kernel function 400 has been identified, various techniques for implementing hot patch 322 may be used, which may also depend on a particular build of kernel 320. Various example techniques are shown in FIGS. 5A-5C and described below.

In some embodiments, hot patch 322 may be implemented using a function tracer (or "ftrace") mechanism associated with Linux kernels. Normally, ftrace may be exploited for collecting a status of a running kernel or for kernel debugging. However, ftrace may also allow the execution of custom code to be injected at the beginning of a Linux kernel function. Relevant to the present disclosure, this ftrace mechanism may be used to implement kernel module function 410, as described above. FIG. 5A illustrates an example execution flow 500A employing an "ftrace" technique for hot patching kernel 320, consistent with the disclosed embodiments.

For the disclosed ftrace hot patching techniques to work, support from the compiler and the linker may be utilized. In other words, kernel 320 may be built with "ftrace" functionality enabled. If enabled, the build system of kernel 320 may automatically enable all the needed compiler and linker options, which may instruct the compiler and the linker to generate a so-called "prologue" at the beginning of every kernel function before its actual code. For example, if ftrace is enabled, kernel function 400 may include prologue operation 510, as shown in FIG. 5A. Consistent with the present disclosure, prologue operation 510 may be in the form of a "no-op" CPU instruction and thus may effectively do nothing when executed by the CPU. However, the presence of prologue operation 510 provides the ability for prologue operation 510 to be replaced by another one—for example, by a jump to another address (or "JMP") operation. By registering a tracer for the kernel function 400, the ftrace mechanism replaces the first no-op CPU instruction at the beginning of the corresponding function by the JMP instruction, as shown in FIG. 5A. This may force the execution flow to continue from the internal ftrace handler to perform ftrace function 520.

Ftrace function 520 may include an operation 522 of saving the CPU registers values in its internal memory. In operation 524, ftrace function 520 looks up the return address and finds the corresponding tracer to be called. It then calls the user-registered handler. In operation 526, ftrace function 520 may then restore the CPU registers values from the saved location. This may be advantageous because execution of the registered handlers in operation 524 may change the CPU registers. Accordingly, to make the original execution flow unaffected by these changes, restoring of previous values of CPU registers may be performed. After completion of the handlers, ftrace function 520 returns back to the original function in operation 528.

Typically, after returning to the original function, the CPU continues execution of the code starting from the second CPU instruction (i.e., operation 402) which, thanks to the compiler help, is the first actual instruction of the kernel function. To implement hot patch 322 using the ftrace mechanism, kernel module 330 may register an ftrace handler that replaces the value of an instruction pointer (IP) register with the address of kernel module function 410. Accordingly, when ftrace function 520 restores the saved CPU registers in operation 526 before continuing execution of the original kernel function, it writes the address of kernel module function 410 into the CPU IP register. Therefore, after returning from ftrace function 520, execution continues at operation 412 instead of operation 402 of the original kernel function 400, as shown in FIG. 5A. Kernel module function 410 may then proceed to enforce a security policy, as described above with respect to FIG. 4. If the requested operation does not violate a security policy, operation 414 may include a JMP operation to jump to operation 402. Alternatively, if the requested operation does violate a security policy, operation 416 may include a return operation to return from kernel module function 410, which may be interpreted by the initial caller as a return from the original kernel function 400.

In some embodiments, hot patch 322 may be implemented using a kernel dynamic probe (or "kprobes") mechanism associated with Linux kernels. Kprobes provides a lightweight interface for kernel modules to implant probes and register corresponding probe handlers, similar to ftrace handlers discussed above. Specifically, the kprobes mechanism allows a break-point instruction to be inserted into almost any place in the kernel memory. The resulting interruption will be handled by the assigned interruption handler. Relevant to the present disclosure, this kprobes mechanism may be used to implement kernel module function 410, as described above. FIG. 5B illustrates an example execution flow 500B employing a "kprobes" technique for hot patching kernel 320, consistent with the disclosed embodiments.

Similar to the ftrace mechanism described above, the kprobes mechanism must be enabled at the kernel build time. The kprobes mechanism operates by allowing a breakpoint CPU instruction to be inserted at a specific place in a kernel function. For example, a breakpoint 512 may be inserted into kernel function 400, as shown. This effectively corrupts the CPU instruction at this breakpoint. As a result of the corrupted instruction, the execution flow will be directed to a kprobes interruption handler 530. To deal with the CPU instruction corruption, the kprobes mechanism first saves the affected instruction (in this case, operation 402) and then spoils it. Similar to ftrace function 510, kprobes interruption handler 530 saves the CPU registers in operation 532, calls registered kprobes handlers in operation 534, and restores the CPU registers upon returning from the handlers in operation 536. Typically, when all the registered kprobes handlers are completed, kprobes interruption handler 530 will single-step the original saved instruction of the now-corrupted operation 402 and then will jump to the next non-corrupted CPU instruction of the original code, in this case, operation 514.

To implement hot patch 322 using the kprobes mechanism, kernel module 330 may register a kprobes handler that replaces the value of an instruction pointer (IP) register with the address of kernel module function 410, much like the ftrace handler described above. Accordingly, when kprobes interruption handler 530 restores the saved CPU registers in operation 536, it writes the address of kernel module function 410 into the CPU IP register. The kprobes handler registered by kernel module 330 also clears the portion of code instructing kprobes interruption handler 530 to single-step the saved CPU instruction before returning.

As a result, after restoring the CPU registers, kprobes interruption handler 530 does not perform the saved version of operation 402 and jumps to operation 412 instead of operation 514, as shown in FIG. 5B. Kernel module function 410 may then proceed to enforce a security policy, as described above with respect to FIG. 4. If the requested operation does violate a security policy, operation 416 may include a return operation to return from kernel module function 410, which may be interpreted by the initial caller as a return from the original kernel function 400. If the requested operation does not violate a security policy, operation 414 may include a JMP operation to return to kernel function 400. However, due to the kprobes handler clearing the portion of code instructing kprobes interruption handler 530 to single-step the saved CPU instruction, operation 402 may not have been completed. Accordingly, kernel module function 410 may prepare a detour buffer saving its own copy of the original operation 402. Instead of jumping to the next uncorrupted operation 514, operation 414 may jump to the saved operation 540, and then, in operation 542, may jump to operation 514. In some embodiments, operation 540 may be adjusted relative to original operation 402, for example, to account for breakpoint 512.

Both the ftrace and kprobes hot patching techniques described above employ built-in features of the Linux™ kernel. A person of ordinary skill in the art would recognize that similar techniques may be employed for other built-in mechanisms, including mechanisms of kernels in other forms of operating systems. As indicated above, both the ftrace and kprobes hot patching techniques require the mechanisms to be enabled during build time. Accordingly, kernel module 330 may attempt various techniques disclosed herein in a predetermined order of priority. For example, kernel module 330 may first attempt the ftrace technique and, if ftrace is not enabled, attempt the kprobes technique (or vice versa). In some embodiments, hot patch 322 may be implemented using a "raw" approach, which may rely on a hardware interruption technique rather than any built-in mechanisms being enabled. Accordingly, this technique may be applied as an alternative to the ftrace and kprobes techniques described above. For example, the hardware interruption technique may be attempted if neither the ftrace or kprobes mechanisms are enabled. While an example order for attempting the various techniques is provided herein, the present disclosure is not limited to any particular order.

FIG. 5C illustrates an example execution flow 500C employing a hardware interruption technique for hot patching kernel 320, consistent with the disclosed embodiments. The hardware interruption technique differs from flows 500A and 500B described above in that it implements the hot patching by editing the CPU opcodes directly. Execution flow 500C is similar to kprobes-based approach illustrated in execution flow 500B in that it corrupts the needed CPU instructions but, in contrast with kprobes, the hardware interruption technique includes placing an illegal CPU opcode instead of a break-point one. For example, as shown in FIG. 5C, kernel module 330 may corrupt operation 402 to include an illegal operation 516. When the execution thread hits such illegal operation 516, a hardware interruption is triggered, which may be handled by kernel module function 410. In some embodiments, similar to with the kprobes technique, kernel module function 410 may store a copy of original operation 402 as operation 550, which may be triggered in operation 414. In operation 552, the execution flow may jump to the first non-corrupted operation 514.

As described above, kernel module 330 may not necessarily evaluate an operation against a security policy itself. For example, kernel module 330 may communicate with a user-level application, such as security agent 340, which may determine whether a specific operation violates a security policy and should be denied. Accordingly, kernel module 330 may implement a communicator function, which may enable efficient communication between kernel and user space components without significant overhead. In some embodiments, kernel module 330 may employ additional security features to ensure these communications are with security agent 340 and not a hostile actor. For example, to identify security agent 340, kernel module 330 may use a cryptographically reliable public key signature verification technique, in which security agent 340 binaries are signed with a private key at the moment of build. Kernel module 330 may store or have access to the corresponding public key (e.g., in its source code), which it may use to verify signature of security agent 340 binaries. This public key may be configured such that it may only be used for signature verification, not for the signature substitution. This approach may allow kernel module 330 to reliably identify security agent 340 binaries as well as to make sure that the binaries were not altered in any way after they were signed.

Figure 6:
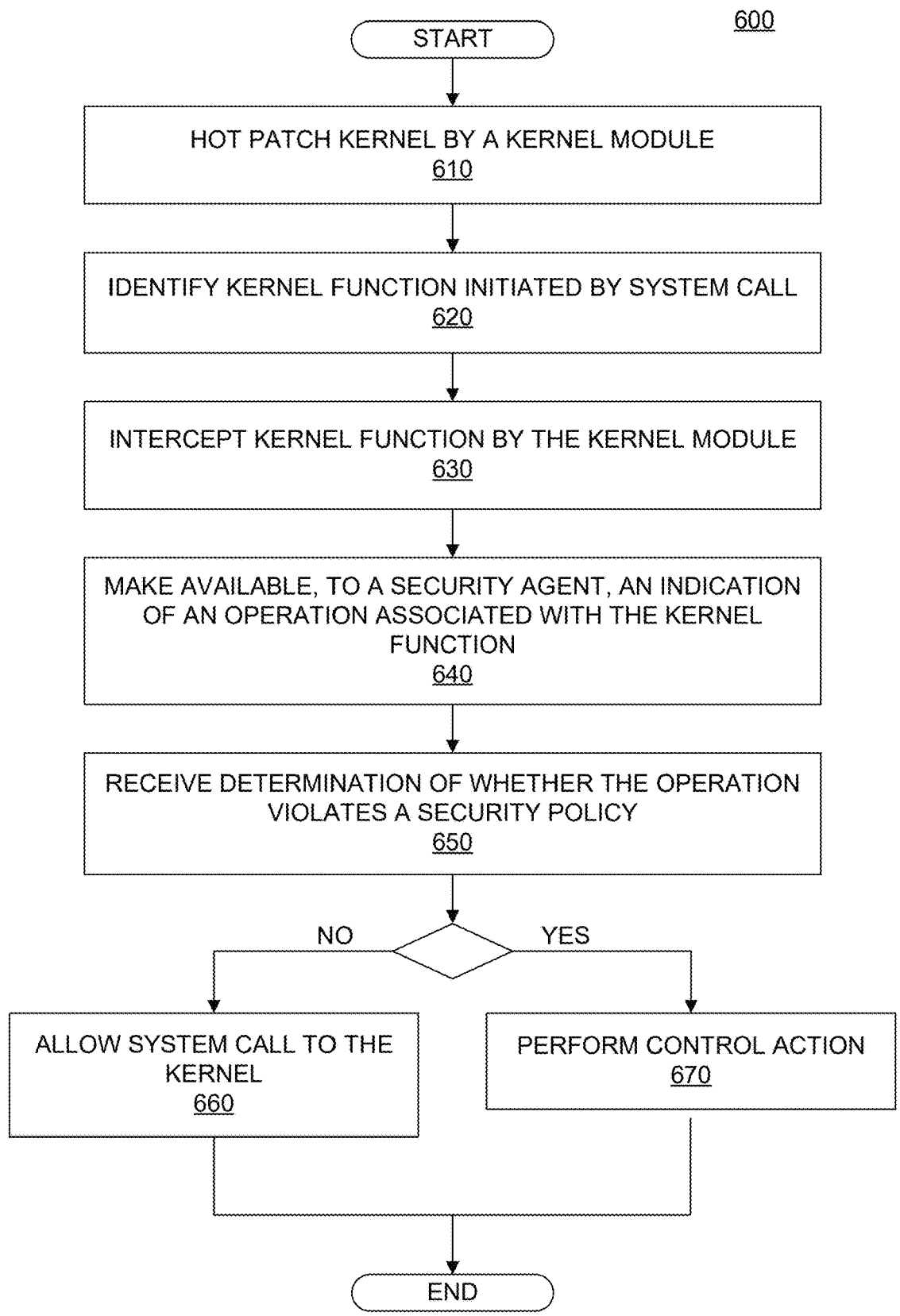
FIG. 6 is a flowchart showing an example process for dynamically securing kernel-level system functions, consistent with the disclosed embodiments.

FIG. 6 is a flowchart showing an example process 600 for dynamically securing kernel-level system functions, consistent with the disclosed embodiments. Process 600 may be performed by at least one processor of a computing device, such as processor 210 described above. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 600. Further, process 600 is not necessarily limited to the steps shown in FIG. 6, and any steps or processes of the various embodiments described throughout the present disclosure may also be included in process 600, including those described above with respect to, for example, FIGS. 3, 4, and 5A-C.

In step 610, process 600 may include hot patching of a kernel by a kernel module loaded into the kernel. For example, this may include performing hot patch 322 by kernel module 330, as described above. Prior to the hot patching, the kernel may be unaltered relative to a build time of the kernel. In other words, other than customizations associated with a particular distribution of the kernel (or any other variations introduced during build time), the kernel may be untreated prior to the hot patching. Accordingly, hot patching of the unaltered kernel may result in changing the kernel's behavior, as described above. In some embodiments, the hot patching of the kernel may be performed based on a request from an additional application. For example, the additional application may be security agent 340 described above.

Hot patching of the kernel may be implemented in a variety of ways, as described above. For example, consistent with the ftrace technique described above, hot patching of the kernel may include replacing an instruction of a kernel function with a replacement instruction. In some embodiments, the instruction may be a no-op instruction (e.g., operation 510) and the replacement instruction may be a JMP instruction directed to an ftrace function, as described above. The ftrace function may be configured to replace a value of an instruction pointer register with an address of a replacement function. For example, as described above, kernel module 330 may register an ftrace handler that replaces the value of an instruction pointer (IP) register with the address of kernel module function 410. Accordingly, when the ftrace function restores saved CPU registers it may write the address of a kernel module function into the CPU IP register, as described above.

As another example, consistent with the kprobes technique described above, hot patching of the kernel may include corrupting an original instruction of a kernel function to generate a corrupted instruction. For example, this may include corrupting operation 402 to include breakpoint 512, as described above. The corrupted instruction may trigger a kprobe mechanism (i.e., triggering kprobes function 530, as described above). The kprobe mechanism may be configured to replace a value of an instruction pointer register with an address of a replacement function. For example, as described above, kernel module 330 may register a kprobes handler that replaces the value of an instruction pointer register with the address of kernel module function 410.

As another example, consistent with the hardware interruption technique described above, hot patching of the kernel may include corrupting a CPU opcode associated with the kernel function. The corrupted CPU opcode may be configured to trigger a hardware interruption to invoke the kernel module. For example, the hot patching may include corrupting operation 516, as described above. In some embodiments, an ftrace or kprobes technique may be prioritized over the hardware interruption technique. For example, the at least one CPU opcode may be corrupted based on a determination that at least one of an ftrace mechanism or a kprobes mechanism has been disabled.

In step 620, process 600 may include identifying a kernel function initiated by a system call associated with a user-level application. For example, step 620 may include identifying kernel function 410, which may be initiated by a system call associated with application 350, as described above.

In step 630, process 600 may include intercepting the kernel function by the kernel module. For example, step 630 may include intercepting kernel function 410 by kernel module 330. The kernel function may be intercepted as a result of the various hot patching techniques described above. For example, the kernel function may be intercepted through registering a handler invoked by an ftrace or kprobes mechanism, where the handler replaces a value of an instruction pointer register, as described above. Alternatively or additionally, the kernel function may be intercepted through a hardware interruption.

In step 640, process 600 may include making available, to a security agent, an indication of at least one operation associated with the kernel function. In some embodiments, the security agent may be an application executing in a user space. For example, step 640 may include making available an indication of operation 402 to security agent 340. In some embodiments, making available the indication of the at least one operation includes querying the security agent to determine whether the at least one operation violates a security policy. The at least one operation may include a wide variety of operations associated with a kernel function, including, for example, execution an executable file, writing to at least one file, removing at least one file, or any other operation that may present potential security concerns.

In step 650, process 600 may include receiving, from the security agent, a determination of whether the at least one operation associated with the kernel function violates at least one security policy. For example, step 650 may include receiving a result from security agent 340 indicating whether the at least one operation violates a security policy. In some embodiments, process 600 may further include authenticating the security agent. For example, as described above, authenticating the security agent may include verifying a signature of the security agent using a cryptographic key.

In step 660, based on the determination indicating the at least one operation does not violate the at least one security policy, process 600 may include allowing the system call to the kernel. For example, step 660 may include returning to operation 402 via operation 414, as described above. In some embodiments, where the original operation is corrupted, allowing the system call to the kernel may include invoking a detour buffer configured to perform the original instruction of the kernel function. For example, step 660 may include performing one of operations 540 or 550, as described above. Step 660 may further include jumping to a subsequent noncorrupted operation, such as operation 514.

In step 670, based on the determination indicating the at least one operation violates at least one security policy, process 600 may include performing at least one control action. In some embodiments, the at least one control action may include preventing the at least one operation. Alternatively or additionally, the at least one control action may include various other actions responsive to the violation of the security policy. For example, the control action may include generating an alert or report that the security policy has been violated. As another example, the control action may include revoking or suspending a privilege of an identity, such as identity 112. The control action may include various other actions, such as terminating an application (e.g., application 350), disabling access to a resource (e.g., target resource 120), or the like. In some embodiments, the control action may be performed, at least in part, by security agent 340.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for dynamically securing kernel-level system functions, the operations comprising:

hot patching of a kernel by a kernel module loaded into the kernel, the hot patching including at least one of modifying a code segment in the kernel or inserting a code segment into the kernel by the kernel module;

identifying a kernel function initiated by a system call associated with a user-level application;

intercepting the kernel function by the kernel module, the intercepting occurring as a result of the hot patching when the system call is initiated;

making available, to a security agent, an indication of at least one operation associated with the kernel function;

receiving, from the security agent, a determination of whether the at least one operation associated with the kernel function violates at least one security policy; and based on the determination indicating the at least one operation does not violate the at least one security policy, allowing the system call to the kernel; or based on the determination indicating the at least one operation violates the at least one security policy, performing at least one control action.

2. The non-transitory computer readable medium of claim 1, wherein, prior to the hot patching, the kernel is unaltered relative to a build time of the kernel.

3. The non-transitory computer readable medium of claim 2, wherein the hot patching of the unaltered kernel results in changing the kernel's behavior.

4. The non-transitory computer readable medium of claim 1, wherein the kernel is associated with a kernel distribution.

5. The non-transitory computer readable medium of claim 1, wherein the hot patching of the kernel is performed based on a request from an additional application.

6. The non-transitory computer readable medium of claim 1, wherein the hot patching of the kernel includes replacing an instruction of a kernel function with a replacement instruction.

7. The non-transitory computer readable medium of claim 6, wherein the instruction is a no-op instruction and the replacement instruction is a JMP instruction directed to an ftrace function.

8. The non-transitory computer readable medium of claim 7, wherein the ftrace function is configured to replace a value of an instruction pointer register with an address of a replacement function.

9. The non-transitory computer readable medium of claim 1, wherein the hot patching of the kernel includes corrupting an original instruction of a kernel function to generate a corrupted instruction.

10. The non-transitory computer readable medium of claim 9, wherein the corrupted instruction triggers a kprobes mechanism.

11. The non-transitory computer readable medium of claim 10, wherein the kprobes mechanism is configured to replace a value of an instruction pointer register with an address of a replacement function.

12. The non-transitory computer readable medium of claim 10, wherein allowing the system call to the kernel includes invoking a detour buffer configured to perform the original instruction of the kernel function.

13. The non-transitory computer readable medium of claim 12, wherein the original instruction of the kernel function performed by the detour buffer is adjusted.

14. The non-transitory computer readable medium of claim 1, wherein the hot patching of the kernel includes corrupting a CPU opcode associated with the kernel function to generate a corrupted CPU opcode.

15. The non-transitory computer readable medium of claim 14, wherein the corrupted CPU opcode is configured to trigger a hardware interruption to invoke the kernel module.

16. The non-transitory computer readable medium of claim 14, wherein the CPU opcode is corrupted based on a determination that at least one of an ftrace mechanism or a kprobes mechanism has been disabled.

17. A computer-implemented method for dynamically securing kernel-level system functions, the method comprising:
hot patching of a kernel by a kernel module loaded into the kernel, the hot patching including at least one of modifying a code segment in the kernel or inserting a code segment into the kernel by the kernel module;
identifying a kernel function initiated by a system call associated with a user-level application;
intercepting the kernel function by the kernel module, the intercepting occurring as a result of the hot patching when the system call is initiated;
making available, to a security agent, an indication of at least one operation associated with the kernel function;
receiving, from the security agent, a determination of whether the at least one operation associated with the kernel function violates at least one security policy; and
based on the determination indicating the at least one operation does not violate the at least one security policy, allowing the system call to the kernel; or
based on the determination indicating the at least one operation violates at the least one security policy, performing at least one control action.

18. The method of claim 17, wherein the at least one control action includes preventing the at least one operation.

19. The method of claim 17, wherein making available the indication of the at least one operation includes querying the security agent.

20. The method of claim 19, wherein the security agent is an application executing in a user space.

21. The method of claim 19, further comprising authenticating the security agent.

22. The method of claim 21, wherein authenticating the security agent includes verifying a signature of the security agent using a cryptographic key.

23. The method of claim 17, wherein the at least one operation includes at least one of: execution of an executable file, writing to at least one file, or removing at least one file.

* * * * *